United States Patent
Alexander et al.

(10) Patent No.: US 7,652,090 B2
(45) Date of Patent: Jan. 26, 2010

(54) FIRE-RESISTANT SILICONE POLYMER COMPOSITIONS

(75) Inventors: Graeme Alexander, Hampton East (AU); Yi-Bing Cheng, East Burwood (AU); Robert Paul Burford, Summer Hill (AU); Robert Shanks, Glen Iris (AU); Jaleh Mansouri, Rosebery (AU); Alma Hodzic, Douglas (AU); Christopher Wood, Ringwood (AU); Antonietta Genovese, Sandringham (AU); Kenneth Willis Barber, Little River (AU); Pulahinge Don Dayananda Rodrigo, Doncaster (AU)

(73) Assignee: Ceram Polymorik Pty Limited, Victoria (AU)

( * ) Notice: Subject to any disclaimer, the term of this patent is extended or adjusted under 35 U.S.C. 154(b) by 510 days.

(21) Appl. No.: 10/523,164

(22) PCT Filed: Aug. 1, 2003

(86) PCT No.: PCT/AU03/00968

§ 371 (c)(1),
(2), (4) Date: Aug. 29, 2005

(87) PCT Pub. No.: WO2004/013255

PCT Pub. Date: Feb. 12, 2004

(65) Prior Publication Data

US 2006/0155039 A1 Jul. 13, 2006

(30) Foreign Application Priority Data

Aug. 1, 2002 (AU) .............................. 2002950536
Oct. 17, 2002 (AU) .............................. 2002952136

(51) Int. Cl.
*C08K 3/34* (2006.01)
*H02G 3/04* (2006.01)

(52) U.S. Cl. .................. 524/449; 524/588; 524/492; 174/68.1

(58) Field of Classification Search ................ 524/448
See application file for complete search history.

(56) References Cited

U.S. PATENT DOCUMENTS 2,684,349 A * 7/1954 Whelton .................... 524/425

(Continued)

FOREIGN PATENT DOCUMENTS

CA 2337317 A1 2/2001

(Continued)

OTHER PUBLICATIONS

Mica, James B. Hedrick, online publication.*

(Continued)

*Primary Examiner*—Randy Gulakowski
*Assistant Examiner*—Robert Loewe
(74) *Attorney, Agent, or Firm*—Andrus, Sceales, Starke & Sawall, LLP

(57) ABSTRACT

A fire resistant composition comprising: a silicone polymer; mica in an amount of from 5% to 30% by weight based on the total weight of the composition; and a limited amount of glass additive sufficient to enable the formation of a self supporting ceramic material at temperatures above the decomposition temperature of the silicone polymer and below the fire rating temperature of the composition. The glass additive addition required to produce the self supporting ceramic material has been found to be preferably from 0.3% to 8% by weight based on the total weight of the composition. The composition is applicable to products formed for fire wall linings, fire partitions, screens, ceilings or linings, structural fire protection, fire door inserts, window or door seals, intumescent seals, in electrical switchboard cabinets or cables. In one cable application, the composition may be used as the extruded intermediate material (2) between the conductor (3) and extruded sheath (4).

46 Claims, 1 Drawing Sheet

U.S. PATENT DOCUMENTS

| | | | | |
|---|---|---|---|---|
| 3,576,940 | A * | 5/1971 | Stone et al. | 174/113 R |
| 3,912,650 | A * | 10/1975 | Khalid et al. | 524/405 |
| 4,172,735 | A * | 10/1979 | Wegerhoff et al. | 106/18.12 |
| 4,189,619 | A * | 2/1980 | Pedlow | 174/505 |
| 4,225,649 | A | 9/1980 | Peterson | |
| 4,269,753 | A * | 5/1981 | Mine et al. | 524/588 |
| 4,269,757 | A * | 5/1981 | Mine et al. | 524/588 |
| 4,385,158 | A * | 5/1983 | Mikami et al. | 525/476 |
| 4,514,466 | A | 4/1985 | Leon et al. | |
| 4,529,467 | A | 7/1985 | Ward et al. | |
| 4,549,041 | A * | 10/1985 | Shingo et al. | 174/113 R |
| 4,686,135 | A | 8/1987 | Obayashi | |
| 4,725,457 | A | 2/1988 | Ward et al. | |
| 4,800,124 | A * | 1/1989 | Davis et al. | 428/391 |
| 4,806,416 | A | 2/1989 | Puza | |
| 4,816,510 | A * | 3/1989 | Yates, III | 524/449 |
| 4,879,066 | A * | 11/1989 | Crompton | 252/606 |
| 4,992,481 | A | 2/1991 | Von Bonin et al. | |
| 5,034,056 | A | 7/1991 | Von Bonin et al. | |
| 5,061,736 | A * | 10/1991 | Takahashi et al. | 521/91 |
| 5,108,832 | A | 4/1992 | Nugent, Jr. et al. | |
| 5,173,960 | A * | 12/1992 | Dickinson | 385/100 |
| 5,227,586 | A * | 7/1993 | Beauchamp | 174/122 R |
| 5,246,974 | A * | 9/1993 | Jonas et al. | 521/82 |
| 5,262,454 | A * | 11/1993 | Leroux et al. | 523/219 |
| 5,284,700 | A | 2/1994 | Strauss et al. | |
| 5,418,272 | A * | 5/1995 | Kawabata et al. | 524/436 |
| 5,424,352 | A * | 6/1995 | Watanabe | 524/433 |
| 5,449,710 | A * | 9/1995 | Umeda et al. | 524/165 |
| 5,523,059 | A * | 6/1996 | Langer | 422/179 |
| 5,830,319 | A * | 11/1998 | Landin | 162/159 |
| 5,851,663 | A * | 12/1998 | Parsons et al. | 428/356 |
| 6,153,668 | A * | 11/2000 | Gestner et al. | 523/179 |
| 6,153,674 | A * | 11/2000 | Landin | 524/35 |
| 6,174,943 | B1 * | 1/2001 | Matsumoto et al. | 524/115 |
| 6,239,378 | B1 * | 5/2001 | Shephard | 174/110 S |
| 6,425,947 | B1 | 7/2002 | Berlin et al. | |
| 6,433,049 | B1 | 8/2002 | Romenesko et al. | |
| 6,454,969 | B1 * | 9/2002 | Nishihara | 252/609 |
| 6,521,834 | B1 * | 2/2003 | Dykhoff et al. | 174/66 |
| 6,555,605 | B1 | 4/2003 | Casiraghi | |
| 6,576,691 | B2 * | 6/2003 | Nakashima et al. | 524/101 |
| 6,935,137 | B2 * | 8/2005 | Kerenyi et al. | 65/110 |
| 6,979,662 | B1 * | 12/2005 | Coster et al. | 501/71 |
| 2003/0031818 | A1 | 2/2003 | Horacek | |
| 2003/0059613 | A1* | 3/2003 | Tirelli et al. | 428/375 |
| 2003/0199623 | A1 | 10/2003 | Demay et al. | |
| 2004/0216914 | A1 | 11/2004 | Vexler et al. | |
| 2005/0205290 | A1* | 9/2005 | Pinacci et al. | 174/121 A |

FOREIGN PATENT DOCUMENTS

| | | | |
|---|---|---|---|
| CN | 2037862 | | 5/1989 |
| DE | 3233504 | | 3/1984 |
| DE | 4132390 | | 4/1993 |
| EP | 0248404 | A2 | 9/1987 |
| EP | 559382 | A1 | 2/1993 |
| EP | 1026700 | | 8/2000 |
| EP | 1043368 | | 10/2000 |
| EP | 1217058 | | 6/2002 |
| EP | 1283237 | | 2/2003 |
| FR | 2822836 | A1 | 10/2002 |
| GB | 2268497 | | 1/1994 |
| GB | 9843251 | | 10/1998 |
| JP | 55078073 | * | 6/1980 |
| JP | 57130521 | * | 8/1982 |
| JP | 5254912 | | 10/1993 |
| JP | 9012888 | | 1/1997 |
| JP | 10094707 | A | 4/1998 |
| JP | 2002105317 | | 4/2002 |
| JP | 2003100149 | | 4/2003 |
| JP | 2003100149 | A * | 4/2003 |
| WO | 98/43251 | | 10/1998 |
| WO | WO 98/43251 | | 10/1998 |
| WO | WO 9843251 | | 10/1998 |
| WO | 0066657 | A1 | 11/2000 |
| WO | 0068337 | A1 | 11/2000 |
| WO | 2004088676 | A1 | 10/2004 |

OTHER PUBLICATIONS

Wayback machine search results for http://minerals.usgs.gov/minerals/pubs/commodity/mica/44097.pdf.*
http://www.chance-hunt.com/ceepree/products/howitworks.htm.*
Certified English-language translation of JP-55078073 provided by Schreiber Translation, Inc. Translation made in Oct. 2008.*
http://www.glassonweb/articles/article/376/, Aug. 2006.*
Derwent Abstract Accession No. 24284 A/13, JP 53-016758 A (Nitto Electric Ind KK) Feb. 16, 1978 Abstract.
Derwent Abstract Accession No. 97-199290/18, JP 09055125 A (Fujikura Ltd) Feb. 25, 1997 Abstract.
Derwent Abstract Accession No. 01217 B/01, JP 78044397 A (Fujikura Cable Works KK) Nov. 28, 1978 Abstract.
Derwent Abstract Accession No. 2001-176528/18, JP 2001035267 A (Yazaki Corp) Feb. 9, 2001 Abstract.
Derwent Abstracts Accession No. 89-303775, JP 1223141 (Fujikura Rubber Works KK), Sep. 6, 1989.
Derwent Abstracts Accession No. 88-187988, JP 63126740 (Hitachi Cable KK), May 30, 1988.
Derwent Abstracts Accession No. 88-067065, JP 63020348 (Fujikura Cable Works KK), Jan. 28, 1988.
Derwent Abstracts Accession No. 84-216836, JP 59127749 (Hitachi Cable KK), Jul. 23, 1984.
Derwent Abstracts Accession No. 84961B/47, JP 54131792 (Sumitomo ELE.IMD.KK), Oct. 13, 1979.
English Translation of Japanese Patent Application Publication No. JP 2003-100149 (A); laid open date: Apr. 4, 2003.
English Translation of Japanese Patent Application Publication No. JP 5287086 (A); published: Nov. 2, 1993.
English Translation of Japanese Patent Application Publication No. JP 9012888 (A); published: Jan. 14, 1997.
English Translation of Japanese Patent Application Publication No. JP 5-254912 (A); laid open date: Oct. 5, 1993.
English Translation of Japanese Patent Application Publication No. JP 2001-35267 (A); advertisement date: Feb. 9, 2001.

* cited by examiner

FIRE-RESISTANT SILICONE POLYMER COMPOSITIONS

CROSS-REFERENCE TO RELATED APPLICATIONS

This application is the U.S. national stage application of International Application PCT/AU2003/000968, filed 1 Aug. 2003, which international application was published on 12 Feb. 2004, as International Publication WO2004/013255 in the English language. The International Application claims priority of Australian Patent Application 2002950536, filed 1 Aug. 2002 and Australian Patent Application 2002952136, filed 17 Oct. 2002.

FIELD OF THE INVENTION

The present invention relates to polymeric compositions which have useful fire barrier properties and which may be used in a variety of applications. The invention also relates to the preparation of such compositions and to their use.

BACKGROUND OF THE INVENTION

Passive fire protection of structures and components is an area that is receiving increased attention. In this context the term "passive" means the use of materials that impart fire resistance. Passive fire protection systems are used extensively throughout the building and transportation industries and typically function by counteracting the movement of heat and/or smoke, by sealing holes, by prolonging stability of structures to which the system is applied and/or by creating thermal and/or physical barriers to the passage of fire, heat and smoke.

One particular area of interest is electric cables applications. These typically consist of a central conductor surrounded by at least an insulating layer. Such cables find widespread use in buildings and indeed form the basis for almost all electric circuits in domestic, office and industrial buildings. In some applications, e.g. in emergency power supply circuits, there is a requirement for cables that continue to operate and provide circuit integrity even when subjected to fire, and there is a wide range of standards for cables of this type. To meet some of these standards, cables are typically required to at least maintain electrical circuit integrity when heated to a specified temperature (e.g. 650, 750, 950, 1050° C.) in a prescribed manner and for a specified time (e.g. 15 min., 30 min., 60 min., 2 hours). In some cases the cables are subjected to regular mechanical shocks during the heating stage. For example, they may be subjected to a water jet or spray either in the later stages of the heating cycle or after the heating stage. In real fires parts of a cable will probably be exposed to a wider range of temperatures for even greater variations in duration. To meet a given standard a cable is typically required to maintain circuit integrity throughout the test. Thus it is important that the insulation maintains low conductivity (even after prolonged heating at high temperatures), maintains its shape so it does not shrink and crack, and is mechanically strong, particularly if it is required to remain in place during shock such as that resulting from mechanical impact due to water jet or spray exposure.

One method of improving the high temperature performance of an insulated cable has been to wrap the conductor of the cable with tape made with glass fibres and coated with mica. Such tapes are wrapped around the conductor during production and then at least one insulative layer is applied. Upon being exposed to increasing temperatures, the outer layer(s) are degraded and fall away, but the glass fibres hold the mica in place. These tapes have been found to be effective for maintaining circuit integrity in fires, but are quite expensive. Further, the process of wrapping the tape around the conductor is relatively slow compared with other cable production steps, and thus wrapping the tape slows overall production of the cable, again adding to the cost. A fire resistant coating that could be applied during the production of the cable by extrusion, thereby avoiding the use of tapes, would be desirable.

A variety of materials have been used to impart fire resistance to structures and components. The use of compositions based on silicone elastomers has found widespread use. However, these compositions tend to have the associated disadvantage that they are converted to powdery substances when exposed to fire because the organic components of the silicone elastomers are pyrolised or combusted. The pyrolysis or combustion products are volatilised and leave an inorganic residue or ash that has little inherent strength. This residue is generally not coherent or self supporting and indeed is often easily broken, dislodged or collapsed. This behaviour mitigates against using silicone elastomers as passive fire protection elements. This means that silicone polymers used as insulation on electric cables must be protected and held in place with physical supports such as inorganic tapes and braids or metal jackets. Compositions in accordance with the present invention may form a physically strong coherent layer around an electrical conductor and therefore do away with the need to use such physical supports.

SUMMARY OF THE INVENTION

The applicant has found that the presence of low levels of glass additive in fire resistant compositions comprising a silicone polymer and mica, markedly improves the mechanical strength of the ceramic formed on heating the composition. In this context a ceramic is an inorganic non-metallic solid material prepared by high temperature processing (e.g. above about 300° C.).

Accordingly, in one aspect, the present invention provides a fire resistant composition comprising:
  a silicone polymer;
  mica in an amount of from 5% to 30% by weight based on the total weight of the composition; and
  a limited amount of glass additive sufficient to enable the formation of a self supporting ceramic material at temperatures above the decomposition temperature of the silicone polymer and below the fire rating temperature of the composition.

In another aspect, there is provided a composition comprising
  a silicone polymer;
  mica in an amount of from 5% to 30% by weight based on the total weight of the composition; and
  a glass additive in an amount of from 0.3% to 8% by weight based on the total weight of the composition.

In a further aspect of the invention, the polymer component of the fire resistant composition consists essentially of a silicone polymer. According to this aspect, there is provided a fire resistant composition comprising:
  a polymer component consisting essentially of a silicone polymer;
  mica in an amount of from 5% to 30% by weight based on the total weight of the composition; and
  a glass additive in an amount of from 0.3% to 8% by weight based on the total weight of the composition.

The glass additive is particularly effective at extending the range of temperatures that result in formation of ceramics with good mechanical properties, thereby improving the performance of these compositions in passive fire protection applications. It also improves the mechanical strength of the resulting ceramic relative to equivalent compositions without the glass additive. The type and mean particle size of the mica is typically selected based on the intended use of the composition, as described below.

The glass additive may take a variety of forms such as powder, particles or fibres. Mixtures of one or more of these may be used. Preferably, the composition comprises glass frits in the form of a powder or fine particles. Irrespective of form, the glass additive preferably has a softening point below 1050° C., for example below 800° C., and most preferably between 300 and 800° C. The softening point of a glass is defined by the temperature at which the viscosity of the glass equals $10^{7.6}$ poise.

The glass additive may be one or a combination of silicate, borate, phosphate and/or lead based glass systems. Suitable glass additives are commercially available.

Without wishing to be bound by theory, it is believed that compositions comprising a silicone polymer and from 5% to 30% weight of mica form a coherent ceramic product after exposure to elevated temperatures as a result of materials of lower melting point, which may be eutectic mixtures, forming at the interface of the mica particles and particles of inorganic compounds formed from the decomposition of the silicone polymer (primarily silicon dioxide). Ordinarily, silicon dioxide and mica each have melting points well above 1050° C. However, the eutectic that forms at the interface melts at a lower temperature. This eutectic material is believed to act as a "bridge" between the silicon dioxide particles and the mica particles, thereby solidifying the composition at the firing temperature. Upon cooling, a coherent ceramic product is formed and this has been found to be self supporting and able to withstand at least minor mechanical impacts or shocks.

It is thought that the presence of the glass additive in the silicone polymer/mica compositions results in a stronger ceramic material being formed if the composition of the invention is exposed to elevated temperature due to the glass softening or melting at a lower temperature than, and/or at a similar temperature to, that required for formation of the eutectic at the interface between the particles. This is thought to assist in "binding" the silicon dioxide and/or the mica particles together. In this way formation of a coherent ceramic product is improved and it is possible to reduce the temperature required to form a comparatively strong ceramic material. If the levels of glass additive are in the range of from 0.3 wt % to 8 wt %, the additive does not adversely affect dimensional stability.

The applicants have found that compositions having glass additives greater than 8% by weight experience sustained volume shrinkage when subjected to temperatures greater than 1000° C. For fire protection applications, it is preferable that this shrinkage is less than 10% and more preferably less than 5%. Hence, the amount of glass added is adjusted to ensure that the composition or articles formed from the composition comply with the desired volume shrinkage limits for a given application at the fire rating temperature. As mentioned earlier, the standards for fire rating of cables vary depending on the country, but are generally based on heating the cables to temperatures such as 6500, 7500, 9500, 10500 in a prescribed manner for a specified time such as 15 minutes, 30 minutes, 60 minutes and 2 hours.

As the composition is required to form a self supporting porous ceramic (typically having a porosity of between 40 vol % to 70 vol %) when exposed to fire rating temperatures, it is essential that the composition does not fuse. In the context of this invention, fuse means that the liquid phase produced in the composition becomes a continuous phase, and/or that the mica particles largely lose their original morphology, and/or that the amount of liquid phase produced becomes sufficient to cause the ceramic to deform due to its own weight. The upper limit for the addition of the glass components is 8% by weight to avoid fusing of the composition occurring below the upper temperature of the exposure. Thus in the resulting ceramic the mica particles essentially retain their morphology, with only minor changes at the edges as a result of 'bridging' to silicon dioxide particles or 'binding' with glass particles. Hence, compositions in accordance with the present invention yield a coherent ceramic product that has substantially the same shape and volume as the composition before it was exposed to elevated temperature. Such compositions can be described as retaining near net shape.

The softening point of the glass has an impact on the properties of the ceramic formed at elevated temperatures. Glasses with relatively low softening points provide enhanced mechanical strength at lower temperatures than glasses with relatively high softening points. The finer the particle size of the glass additive, the more effective it is at enhancing the mechanical strength of the resulting ceramic. A blend of glass additives having low and high softening points may be used to provide a composition which yields a ceramic on heating which develops good mechanical properties after exposure to a large range of temperatures.

For cable applications, where the electrical resistivity of the composition is important, the levels of mica and/or glass additive must be selected carefully. For a given composition, if the level of mica is too high electrical integrity is compromised due to an unacceptable reduction in electrical resistivity of the composition and/or from dielectric breakdown when the compositions are subjected to high temperatures for extended periods of time. At high temperatures, alkali metal ions, from either the mica or the glass additive, in the liquid phase tend to provide conductive pathways, resulting in the need to limit the level of mica and/or the level of glass additive. For this reason it may also be appropriate to select a glass additive having a low alkali metal oxide content (eg preferably less than 30% alkali metal oxide content) and/or a fine particle size to reduce the overall level of the additive required to achieve the desired mechanical properties. Unexpectedly, it has also been found that the glass additive may improve the adhesion between an adjacent metal surface (eg the cable conductor) and the ceramic formed upon heating of compositions of the present invention.

The compositions of the present invention include as an essential component a silicone polymer. The nature of the silicone polymer is not especially critical and one skilled in the art will be aware as to the type of polymers which may be used. Useful silicone polymers are described in detail in the prior art including U.S. Pat. No. 4,184,995, U.S. Pat. No. 4,269,753, U.S. Pat. No. 4,269,757 and U.S. Pat. No. 6,387,518. By way of more specific illustration, the silicone polymer may be an organopolysiloxane composed of units of formula:

$$R_rSiO_{\frac{4-r}{2}}$$

in which

R may be identical or different and are unsubstituted or substituted hydrocarbon radicals, r is 0, 1, 2 or 3 and has an average numerical value of from 1.9 to 2.1.

Examples of hydrocarbon radicals R are alkyl radicals, such as the methyl, ethyl, n-propyl, isopropyl, n-butyl, isobutyl, tert-butyl, n-pentyl, isopentyl, neopentyl, tert-pentyl and hexyl radicals, such as n-hexyl, heptyl radicals, such as the n-heptyl, octyl radicals, such as the n-octyl, and isooctyl radicals, such as the 2,2,4-trimethylpentyl, nonyl radicals, such as the n-nonyl, decyl radicals, such as the n-decyl, dodecyl radicals, such as the n-dodecyl, octadecyl radicals, such as the n-octadecyl; cycloalkyl radicals, such as cyclopentyl, cyclohexyl and cycolheptyl and methyl cyclohexyl radicals; aryl radicals, such as the phenyl, biphenyl, napthyl and anthryl and phenanthryl; alkaryl radicals, such as o-, m- or p-tolyl radicals, xylyl and ethylphenyl radicals; and aralkyl radicals, such as benzyl and $\alpha$- and $\beta$-phenylethyl.

Examples of substituted hydrocarbon radicals R are halogenated alkyl radicals, such as 3-chloropropyl, the 3,3,3-trifluoropropyl and the perfluorohexylethyl and halogenated aryl, such as the p-chlorophenyl and the p-chlorobenzyl.

The radicals R are preferably hydrogen atoms or hydrocarbon radicals having from 1 to 8 carbon atoms, preferably methyl. Other examples of radicals R are vinyl, allyl, methallyl, 1-propenyl, 1-butenyl and 1-pentenyl, and 5-hexenyl, butadienyl, hexadienyl, cyclopentenyl, cyclopentadienyl, cyclohexenyl, ethynyl, propargyl and 1-propynyl. The radicals R are preferably alkenyl radicals having from 2 to 8 carbon atoms, particularly vinyl.

The end groups of the polymers may be trialkylsiloxy groups, for example trimethylsiloxy or dimethylvinylsiloxy groups, or derived groups where one or more of the alkyl groups has been replaced by hydroxy or alkoxy groups.

The composition may include one or more than one crosslinkable silicone polymer. The crosslinkable polymer can be any one which can be crosslinked by any one of the methods used for commercially available organopolysiloxane polymers including by free radical crosslinking with a peroxide through the formation of ethylenic bridges between chains, by addition reactions including reaction of silylhydride groups with allyl or vinyl groups attached to silicon, through condensation reactions including the reactions of silanols to yield Si—O—Si crosslinks, or using other reactive groups. Depending on the type of silicone polymer used the composition will therefore further comprise a suitable crosslinking agent. Suitable crosslinking agents are commercially available, for example there is a wide range of useful peroxides suitable for use in this application, such as dibenzoyl peroxide, bis (2,4-dichlorobenzoyl) peroxide, dicumyl peroxide or 2,5-bis(tert-butylporoxy)-2,5-dimethylhexene or also mixtures of these, and when appropriate they may be included in the composition during the compounding process.

The silicone polymers that can be used also include platinum catalysed liquid silicone polymers with unsaturated (typically vinyl) side chains that crosslink through the application of heat in an addition reaction. Such polymers are usually supplied as two components that are mixed together just prior to use. The viscosity of these polymers ranges from pourable liquids through to stiff pastes. The silicone rubber compositions may also comprise a room temperature moisture-curable organopolysiloxane (RTV), for which an example is given in more detail in U.S. Pat. No. 5,023,295. In this case it comprises: (a) a diorganopolysiloxane having terminal hydroxyl groups, (b) crosslinking agent having an average of at least 3 hydrolysable functional groups linked to a silicone atom per molecule, (c) a condensation catalyst, and (d) a platinum metal or compound. Other room temperature curing systems possessing alkyl silicate and metal salts of carboxylic acids as one part which is combined with the silanol end stopped diorganopolysiloxane and inert filler as the other part, as for example described in U.S. Pat. No. 4,184,995 will also be included.

Another type, especially suitable for cable insulation, is where the silicone polymer is of high molecular weight and has vinyl side chains that require heat to crosslink, either through platinum catalysed addition reactions or peroxide initiated free radical reactions. These silicone polymers are widely available commercially from major silicone producers.

The organopolysiloxane raw materials preferably also comprise reinforcing fillers such as precipitated or pyrogenic silicas and/or non-reinforcing fillers. Further, the surface of these silica type fillers may be modified by straight or branched organopolysiloxanes, organo-chlorosilanes and/or hexamethyl disilazanes.

The compositions in accordance with the present invention include mica as an essential component. The two most common classes of commercially available mica are muscovite and phlogopite. Muscovite mica is a dioctahedral alkali aluminium silicate. Muscovite has a layered structure of aluminium silicate sheets weakly bonded together by layers of potassium ions. It has the following composition $KAl_3Si_3O_{10}(OH)_2$. Phlogopite mica is a trioctahedral alkali aluminium silicate. Phlogopite has a layered structure of magnesium aluminium silicate sheets weakly bonded together by layers of potassium ions. It has the following composition $KMg_3AlSi_3O_{10}(OH)_2$. Both mica types are typically present in the form of thin plates or flakes having sharply defined edges.

Compositions containing phlogopite mica display greater mechanical strength when heated to about 1000° C. to form ceramics. However, they also show greater shrinkage than those containing muscovite mica. The use of muscovite mica is preferred in applications where greater dimensional stability is required. It has been found that the high temperature electrical properties of silicone polymer compositions of the present invention are slightly better if muscovite mica is used instead of phlogopite mica.

Commercially available grades of mica have a range of particle size distributions. It has been found that the particle size of the mica has an important effect on the dimensional stability and mechanical properties of the ceramic product formed when a composition of the present invention is exposed to elevated temperature. Typically, the mica is selected so that it has a mean particle size of from 15 µm to 250 µm. Micas at the lower end of this range (e.g. less than 50 µm mean particle size) result in ceramics that are mechanically stronger but display greater shrinkage that can result in cracking. Micas at the middle and upper end of the range are preferable for use in cable applications or other applications where shape retention is particularly important. If the mean particle size of the mica is too large or the amount of mica present is too high, the resultant composition tends to be difficult to process and form into the desired configuration, for instance by extrusion. In addition, the mechanical properties of crosslinked silicone polymers containing coarser particle size grades of mica or high mica levels are poorer. The coarser mica particles tend to produce preferential alignments along their crystallographic basal planes when the compositions are extruded, or molded under compression, and this can result in low tear strength.

The mica may be surface treated with a silane coupling agent in order to enhance the mechanical properties before and/or after firing. Examples of silane coupling agents are vinyltrimethoxysilane, aromatic silane, aryl silane, epoxysilane, acrylsilane, polymeric silane and mercaptosilanes such as mercaptopropyltrimethoxysilane. The silane coupling agent is preferably present in the range of from 0.05% to 2% by weight of the composition.

In accordance with the present invention the selection of the appropriate mica type, mean particle size and mica level will depend on the intended application, the required processing properties of the composition, the required mechanical properties of the crosslinked composition, and the required strength and extent of dimension retention required when converted to the resulting ceramic. The properties which these compositions are desired to exhibit when exposed to the range of elevated temperatures commonly associated with a fire may be manipulated by suitable choice of the type and particle size of the mica which is used. In other words, the properties of these compositions may be tailored to the intended end use.

In accordance with the invention, the mica addition is from 5% to 30% by weight based on the total weight of the composition. For cable applications in particular, the preferred level of mica is from 15% to 30% by weight and more preferably from 20% to 30% by weight. For fire resistant cable and non-cable applications where dimensional stability is important, the mean particle size of the mica is preferably in the range of 50-200 μm. Muscovite mica is the type generally preferred for those applications, but greater mechanical strength after firing at 1000° C. can be obtained using phlogopite mica.

In another aspect of the present invention, there is provided a fire resistant composition consisting essentially of the silicone polymer, mica, glass additive and crosslinking agent. This means that the compositions do not contain any other component which would materially affect the properties of the composition and/or the ceramic formed upon heating the composition to elevated temperature.

Other components may be incorporated into the compositions of the present invention. The addition of zinc borate, magnesium hydroxide or alumina trihydrate, improves the flame retardant properties of the composition. Additionally, some may improve the strength of the ceramic. Other components include inorganic fibres or other fibre reinforcing materials, materials that reduce thermal conductivity (eg exfoliated vermiculite), chemical foaming agents (which serve to reduce density, improve thermal characteristics and further enhance noise attenuation), extending non-reactive fillers, silica, and intumescing materials (to obtain a composition that expands upon exposure to fire or elevated temperature). Suitable intumescing materials include natural graphite, unexpanded vermiculite or unexpanded perlite. Other types of intumescing precursors may also be used.

The compositions of the present invention may be prepared by blending and heating the various components. Heating is required for peroxide crosslinking of the silicone polymer to form a silicone elastomer. Any conventional compounding equipment may be used. If the composition has relatively low viscosity, it may be processed using dispersing equipment, for instance of the type used in the paint industry. Materials useful for cable insulation applications are of higher viscosity (higher molecular weight) and may be processed using a two roll mill, internal mixers, twin-screw extruders and the like. Depending upon the type of crosslinking agent/catalyst added, the composition can be cured by exposure to air at 200° C., in an autoclave with high pressure steam, using continuous vulcanisation equipment including a liquid salt bath and, conceivably, by exposure to any medium that will cause the peroxide to decompose, including microwaves, ultrasonic waves etc.

The compositions of the present invention may be used in a large number of applications where fire resistance is desired. For example, the compositions may be used to form a fire resistant building panel. The composition may be used by itself or together with one or more layers of other materials.

The compositions of the present invention may be provided in a variety of different forms, including:

1. As a sheet, profile or complex shape. The composition may be fabricated into these products using standard polymer processing operations, eg extrusion, moulding (including hot pressing and injection moulding). The products formed can be used in passive fire protection systems. The composition can be used in its own right, or as a laminate or composite with another material (for example, plywood, vermiculite board or other). In one application the composition may be extruded into shapes to make seals for fire doors. In the event of a fire, the composition is converted into a ceramic thus forming an effective mechanical seal against the spread of fire and smoke.

2. As a pre-expanded sheet or profile. This form has additional benefits compared with the above, including reduced weight and the capacity for greater noise attenuation and insulation during normal operating conditions. Porosity can be incorporated into the material during manufacture of the sheet or profile by thermal degradation of a chemical blowing agent to produce a gas product, or by physically injecting gas into the composition before curing.

3. As an intumescent product, which expands by foaming when exposed to heat or fire. In this application the product can be used, for example, around pipework or penetrations between walls. In the event of a fire the product expands to fill the void and provide an effective plug to prevent the spread of fire. The intumescent material may be in the form of an extrudable paste or a flexible seal.

4. As a mastic material which can be applied (for example from a tube as per a conventional silicone sealant) as a seal for windows and other articles.

5. As a paint, or an aerosol based material, that could be sprayed or applied using a brush.

Specific examples of passive fire protection applications where this invention may be applied include but are not limited to firewall linings for ferries, trains and other vehicles, fire partitions, screens, ceilings and linings, structural fire protection [to insulate the structural metal frame of a building to allow it to maintain its required load bearing strength (or limit the core temperature) for a fixed period of time], fire door inserts, window and door seals, intumescent seals, and compounds for use in electrical switchboard cabinets or similar applications.

According to a further aspect of the invention there is provided an electrical cable comprising a conductor and a polymeric composition extruded over the conductor, the polymeric composition comprising:

a silicone polymer, and mica in an amount of from 15% to 30% by weight based on the total weight of the composition, the mica having a mean particle size of from 50 μm to 200 μm; and a glass additive in an amount of from 0.3% to 8% by weight based on the total weight of the composition. The compositions of the present invention are especially useful in the coating of conductors. The compositions are therefore suitable for the manufacture of electrical cables that can provide circuit integrity in the case of fire.

Figure 1:
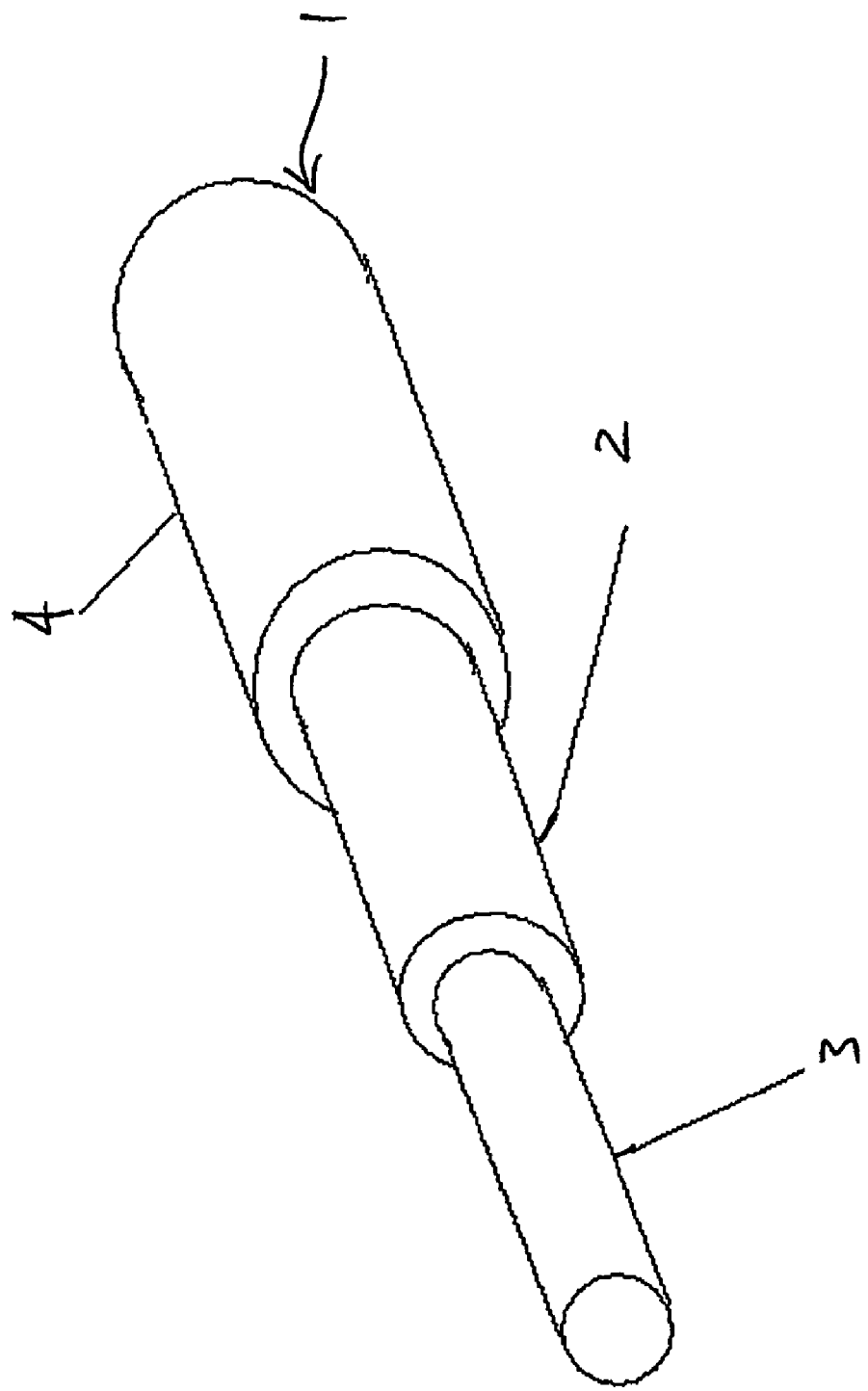
FIG. 1 is a perspective view of a typical cable for use in the invention.

In the design of such cables 1, the compositions of this invention can be used as an extruded insulation directly over conductors 3. The composition can take the form of an interstice filler in multi-core cables, as individual extruded fillers added to an assembly to round off the assembly, as an inner layer prior to the application of wire or tape armour or as an extruded outer sheathing layer 4.

In practice the composition will be extruded onto the surface of a conductor. This extrusion may be carried out in a conventional manner using conventional equipment. Typically the composition will be crosslinked immediately after extrusion. The thickness of the layer of insulation will depend upon the requirements of the particular standard for the size of conductor and operating voltage. Typically the insulation will have a thickness from 0.6 to 3 mm. For example, for a 35 mm² conductor rated at 0.6/1 kV to Australian Standards would require an insulation thickness of approximately 1.2 mm.

DESCRIPTION OF PREFERRED
EMBODIMENTS AND EXAMPLES

The following examples illustrate the present invention.

The compositions in all examples were based on a commercially available silicone elastomer. The mean particle size of the mica was determined by sieve analysis and, unless otherwise indicated, the mica used was muscovite with a mean particle size of 160 μm. Glass frit A has a softening point of 525° C. and has the analysed composition: $SiO_2$, 33.5%; $Na_2O$, 18.2%; $K_2O$, 10.8%; $TiO_2$, 19.3%; $P_2O_5$, 1.8%; $V_2O_5$, 8.7%. Glass frit B has a softening point of 800° C. and has the analysed composition: $SiO_2$, 39.2%; ZnO, 36.2%; $Na_2O$, 2.9%; $K_2O$, 2.2%; CaO, 5.3%; MgO, 0.2%; $ZrO_2$, 0.8%. Glass frit C had a softening point of 525° C. and has analysed composition: $SiO_2$, 37.7%; $Na_2O$, 14.6%; $K_2O$, 10.6%; $TiO_2$, 16%; $Fe_2O_3$, 3%; BaO, 2.6%; $P_2O_5$, 1.3%; $Al_2O_3$, 1.2%; CaO, 1.14%; CuO, 0.4%; MgO, 0.37%; $ZrO_2$, 0.8%). Dicumyl peroxide was included in the compositions for effecting thermal crosslinking. All compositions listed in the examples are given in % wt/wt. The compositions were made by the procedure described below.

A two-roll mill was used to prepare the compositions. The silicone elastomer was banded on the mill (10-20° C.) and first mica, and then the glass frits, were added and allowed to disperse by separating and recombining the band of material just before it passed through the nip of the two rolls. When these were uniformly dispersed in the elastomer, the peroxide was added and dispersed in a similar manner.

The compositions for the tests in Examples 1-5 and 11 were then removed from the mill as a sheet, and then pressed and vulcanized between two 10 mm steel backing plates covered with sheets of 250 micron polyester film in a picture-frame (1.7 mm or 3 mm thick) mould for 30 minutes at 170° C. and 7 MPa.

Example 1

Specimens of dimensions 38.1 mm×13.3 mm×1.7 mm, made from thermally crosslinked (170° C., 30 minutes, 7 MPa) compositions containing the silicone elastomer and peroxide with 20% wt/wt and 30% wt/wt mica and differing levels of a low softening point glass frit, were heated to the temperatures indicated at 10° C. per minute and then held at either 600° C. or 1030° C. for 30 minutes in air. The percentage changes in volume for the cooled samples are given in Table 1 below. The results show that if the levels of the glass frits are increased to 10%, there is significant shrinkage of the compositions at 1030° C.

TABLE 1

TABLE 1: The effect of mica levels, glass frit levels and firing temperature on percentage volume change.

| Composition (% wt/wt) | 600° C. | 1030° C. |
|---|---|---|
| Silicone/mica/peroxide (78:20:2) | +7 | +1 |
| Silicone/mica/glass frit A/peroxide (73:20:5:2) | +7 | 0 |
| Silicone/mica/glass frit A/peroxide (70.5:20:7.5:2) | −1 | −7 |
| Silicone/mica/glass frit A/peroxide (68:20:10:2) | +6 | −22 |
| Silicone/mica/glass frit A/peroxide (63:30:5:2) | +7 | −1 |
| Silicone/mica/glass frit A/peroxide (58:30:10:2) | +2 | −45 |

(− denotes shrinkage)

Example 2

Specimens of dimensions 38.1 mm×13.3 mm×1.7 mm, made from thermally crosslinked (170° C., 30 minutes, 7 MPa) compositions containing silicone elastomer and peroxide with 20% wt/wt and 30% wt/wt mica and differing levels of a low softening point glass frit (A) were heated at 10° C. per minute to 600° C. and then maintained at the temperature for 30 minutes in air. The penetration load of the cooled samples was determined using an Instron Universal Testing Machine with a 90° cone tip indentor attached to the upper loading frame. The penetration load is the peak load attained as the indentor penetrates and subsequently fractures the specimen. The flat fired ceramic specimen was placed on a wooden flat plate, and the penetration load was measured using a crosshead speed of 1 mm/min. The results (Table 2) show that there is a synergistic improvement in the penetration load by using a combination of the mica and the low softening point glass frit. Thus 20% mica alone and 7.5% glass frit alone give penetration loads of 26 and 4 N respectively, but the combination of the two gives a value of 45 N. The penetration load of the compositions containing both mica and glass frit increases as the level of glass frit increases.

TABLE 2

TABLE 2: The effect of mica levels and low softening point glass frit levels on penetration load for specimens cooled after firing at 600° C. for 30 minutes.

| Composition (% wt/wt) | Penetration load (N) |
|---|---|
| Silicone/glass frit A/peroxide (90.5:7.5:2) | 4 |
| Silicone/mica/peroxide (78:20:2) | 26 |
| Silicone/mica/glass frit A/peroxide (73:20:5:2) | 40 |
| Silicone/mica/glass frit A/peroxide (70.5:20:7.5:2) | 45 |
| Silicone/mica/glass frit A/peroxide (68:20:10:2) | 56 |

Example 3

Specimens of dimensions 50 mm×14 mm×3 mm, made from thermally crosslinked (170° C., 30 minutes, 7 MPa) compositions containing silicone elastomer and peroxide with mica and differing levels of either low or high softening glass frits (frit A and B respectively) were heated to 600° C., 800° C. and 1000° C. and maintained at these temperatures for 30 minutes in air. The flexural strength of the cooled samples was determined in three-point bend mode using an Instron Universal Testing Machine. The results (Table 3) show that the combination of silicone/mica/glass frit produces synergistic improvements in flexural strength over silicone/mica and silicone/glass frit compositions.

Compositions of 2.5% glass frit A in silicone and 20% mica in silicone fired at 1000° C. produce flexural strengths of 0.5 and 2.2 MPa respectively. The combination of silicone/mica/glass frit produces flexural strengths of 3.2 MPa using 2.5% of frit A and 5.9 MPa using 2.5% of frit B. The results show that the high softening point glass is more effective in enhancing flexural strength after firing at this high temperature, and that reducing the content of frit B to 1.25% reduces the flexural strength to 4.2 MPa.

For samples fired at 800° C., the results show that the addition of a high softening point glass frit (frit B) provides no strength improvement over a silicone/mica composition. However, the addition of a low softening point glass frit (frit A) to silicone/mica results in a three-fold increase in the flexural strength of samples fired at 800° C. (0.7 MPa vs. 2.1 MPa).

TABLE 3

TABLE 3: The effect of mica and glass frit additions on the flexural strength of specimens cooled after firing at 600° C., 800° C. and 1000° C. for 30 minutes in air. (+ the firing conditions and method for determining flexural strength differ from those used in other examples)

| Compositions (% wt/wt) | Flexural Strength (MPa)+ | | |
|---|---|---|---|
| | 600° C. | 800° C. | 1000° C. |
| Silicone/peroxide (98:2) | * | * | 0.1 |
| Silicone/glass frit A/peroxide (95.5:2.5:2) | * | 0.5 | 0.5 |
| Silicone/mica/peroxide (78:20:2) | 0.3 | 0.7 | 2.2 |
| Silicone/mica/glass frit A/peroxide (75.5:20:2.5:2) | — | 2.1 | 3.2 |
| Silicone/mica/glass frit B/peroxide (76.25:20:1.25:2) | 0.3 | 0.7 | 4.2 |
| Silicone/mica/glass frit B/peroxide (75.5:20:2.5:2) | 0.4 | 0.6 | 5.9 |

\* = samples too weak to be tested;
— = sample not tested

Example 4

A

The particle size of as received glass frit B (mean particle size=12 μm) was reduced to a mean particle size of about 6 μm by ball milling. Specimens prepared under the same conditions as outlined in the previous Example were fired at 600° C., 800° C. and 1000° C. for 30 minutes in air. The flexural strength of the cooled samples was determined in three-point bend mode using an Instron Universal Testing Machine and the results are shown in Table 4.

TABLE 4

TABLE 4: The effect of glass frit particle size on the flexural strength of specimens cooled after firing at 600° C., 800° C. and 1000° C. for 30 minutes in air.

| Compositions | Flexural Strength (MPa) | | |
|---|---|---|---|
| | 600° C. | 800° C. | 1000° C. |
| Silicone/mica/peroxide/ milled glass frit B (75.5:20:2:2.5) | 0.17 | 0.35 | 2.52 |
| Silicone/mica/peroxide/ glass frit B (as received) (75.5:20:2:2.5) | 0.1 | 0.32 | 1.88 |

The glass frit with finer particle size improves the strength of samples at the highest temperature by about 1.3 times. However, it provides no significant improvement at lower temperatures.

B

Specimens of dimensions 50 mm×14 mm×2 mm were made from thermally crosslinked (170° C., 30 minutes, 7 MPa) compositions containing: silicone elastomer and peroxide with mica and different glass fibres (C-glass fibre, softening point of ~700° C., and E-glass fibre, softening point of 840° C.); and mica and glass frit B with mean particle sizes of 12 μm (as received) and 6 μm (milled); and mica and two levels of low-softening glass frit and the mixture of glass frit B and glass frit C. Specimens were fired at 600° C., 800° C. and 1000° C. for 30 minutes in air. The flexural strength of the cooled samples was determined in three-point bend mode using an Instron Universal Testing Machine.

TABLE 5

TABLE 5: The effect of low-softening point glass frits, mixture of low and high softening point glass frits and glass fibre additions on the flexural strength of specimens cooled after firing at 600° C., 800° C. and 1000° C. for 30 minutes in air.

| Compositions | Flexural Strength (MPa) | | |
|---|---|---|---|
| | 600° C. | 800° C. | 1000° C. |
| Silicone/mica/ peroxide (78:20:2) | * | 0.34 | 0.64 |
| Silicone/mica/ peroxide/C-glass fibre (74:20:2:4) | 0.25 | 1.38 | 6.2 |
| Silicone/mica/ peroxide/C-glass fibre (70:20:2:8) | 0.87 | 2.78 | 5.29 |
| Silicone/mica/ peroxide/E-glass fibre (74:20:2:4) | 0.16 | 0.75 | 2.27 |
| Silicone/mica/peroxide/ milled glass frit B (76.75:20:2:1.25) | 0.12 | 0.34 | 1.70 |
| Silicone/mica/peroxide/ glass frit C (76.75:20:2:1.25) | 0.64 | 1.65 | 2.92 |
| Silicone/mica/peroxide/ glass frit C (75.5:20:2:2.5) | 0.88 | 2.30 | 3.53 |
| Silicone/mica/peroxide/ milled glass frit B/ glass frit C (75.5:20:2:1.25:1.25) | 0.52 | 1.9 | 4.84 |

\* too weak for testing

The results (Table 5) show that the addition of both glass frits and glass fibres significantly improve the flexural strength of the ceramics obtained on cooling from high temperatures.

For samples fired at 800° C., the results show that the addition of a low softening point glass frit (frit C) or low softening point glass fibre (C-glass fibre) results in about a five-fold increase in the flexural strength of samples when these additives added in low levels (1.25% for frit C and 4% for C-glass fibre). When higher amounts of additives (2.5% for frit C and 8% for C-glass fibre) are added strength is increased up to eight-fold in comparison to compositions with no glass additives.

When half of the high-softening point glass frit (milled frit B) is replaced with low-softening point glass frit (frit C), the flexural strength of the ceramic was improved at all firing temperatures (compare data in Tables 4 and 5). The combinations of silicone/mica/glass frit produces flexural strengths of 2.52 MPa using 2.5% milled glass frit B and 4.84 MPa using 1.25% milled glass frit B and 1.25% glass frit C when fired at 1000° C. The strength improvements at 800° C. and 600° C. are about 5 and 3 folds, respectively.

C

The dimensional changes for the crosslinked compositions shown in Tables 4 and 5 after firing were determined (Table 6). The results show that the addition of glass frits and glass fibres increases the shrinkage at 1000° C., while it offsets or decreases the expansion at 600° C. Shrinkage at 1000° C. is more when low temperature glass frit (frit C) or glass fibre (C-glass fibre) is added as compared with high temperature glass frit (frit B) and glass fibre (E-glass fibre).

All of these samples expand in thickness at all temperatures, however the addition of glass frits and glass fibres reduces this effect and is most pronounced when low melting point frits and fibres are used.

TABLE 6

TABLE 6: The effect of glass frits and glass fibre additions on the dimensional changes of specimens cooled after firing at 600° C., 800° C. and 1000° C. for 30 minutes in air.

| Compositions | Shrinkage (−)/expansion (%) | | |
|---|---|---|---|
| | 600° C. | 800° C. | 1000° C. |
| Silicone/mica/peroxide (78:20:2) | 1.5 | 0.57 | −0.73 |
| Silicone/mica/peroxide/C-glass fibre (74:20:2:4) | −0.22 | −0.67 | −4.40 |
| Silicone/mica/peroxide/C-glass fibre (70:20:2:8) | −0.12 | −0.18 | −7.60 |
| Silicone/mica/peroxide/E-glass fibre (74:20:2:4) | 0.3 | 0.89 | −1.66 |
| Silicone/mica/peroxide/milled glass frit B (76.75:20:2:1.25) | 0.44 | 0.87 | −2.70 |
| Silicone/mica/peroxide/milled glass frit B (75.5:20:2:2.5) | 0.52 | 0.00 | −3.0 |
| Silicone/mica/peroxide/glass frit B (as received) (75.5:20:2:2.5) | 0.64 | 0.59 | −3.5 |
| Silicone/mica/peroxide/glass frit C (76.75:20:2:1.25) | −0.37 | −1.2 | −5.7 |
| Silicone/mica/peroxide/glass frit C (75.5:20:2:2.5) | −0.8 | −1.96 | −5.4 |
| Silicone/mica/peroxide/milled glass frit B/glass frit C (75.5:20:2:1.25:1.25) | 0.26 | −0.17 | −5.3 |

Example 5

Samples of the thermally crosslinked (170° C., 30 minutes, 7 MPa) compositions listed in Table 7 were heated at 10° C. per minute to 1000° C. During heating a voltage was placed across the samples and the current flow in the circuit was monitored by an ammeter. The results were then converted to volume resistivities by applying Ohm's Law. It is known that electrical resistivity decreases with increasing temperature, in glasses which contain mobile ions. A decrease in volume resistivity (increase in current flow) with increasing temperature is observed over the measured temperatures of 900° C., 950° C. and 1000° C. for all of the different compositions as shown in Table 7 below.

The addition of alkali-containing mica to silicone causes a reduction in volume resistivity. The reduction in volume resistivity is slightly greater if phlogopite mica (e.g. mica B') is used instead of muscovite mica. The addition of a high-alkali, low softening point glass frit (frit A) to silicone/mica causes a large reduction in volume resistivity, a result of the high levels of sodium and potassium in the frit. When the high-alkali frit is replaced by a high softening point, low-alkali frit (frit B), the reduction in volume resistivity compared to silicone/mica is only modest. Reducing the level of mica in a silicone/mica/glass frit composition by partial replacement of the mica with an alkali-free silicate filler has the effect of increasing the resistivity of the compound.

TABLE 7

TABLE 7: Effect of level of mica and glass frits on the electrical volume resistivity at high temperatures.

| Composition (% wt/wt) | Volume Resistivity (ohm-cm) | | |
|---|---|---|---|
| | 900° C. | 950° C. | 1000° C. |
| Silicone/peroxide (98:2) | High, off scale | $2.0 \times 10^7$ | $1.0 \times 10^7$ |
| Silicone/mica/peroxide (68:30:2) | $3.1 \times 10^7$ | $4.5 \times 10^6$ | $1.8 \times 10^6$ |
| Silicone/mica A*/peroxide (68:30:2) | $5.6 \times 10^6$ | $2.1 \times 10^6$ | $5.6 \times 10^5$ |
| Silicone/mica/glass frit A/peroxide (65.5:30:2.5:2) | $1.0 \times 10^5$ | $6.0 \times 10^4$ | $3.2 \times 10^4$ |
| Silicone/mica/glass frit B/peroxide (65.5:30:2.5:2) | $6.3 \times 10^6$ | $2.3 \times 10^6$ | $6.7 \times 10^5$ |
| Silicone/mica/alkali-free filler/glass frit B/peroxide (65.5:20:10:2.5:2) | $1.5 \times 10^7$ | $5.21 \times 10^6$ | $1.4 \times 10^6$ |

*Phlogopite mica with a mean particle size of 50 μm

Example 6

Performance in a Fire Test

Experimental cables were made with 1.5 mm² plain copper conductors insulated in one case with a silicone/mica/peroxide (78:20:2) composition and in another with a silicone/mica/glass frit B/peroxide (76.75:20:1.25:2) composition. The compositions were crosslinked during production. These insulated conductors were twisted together and sheathed with a commercially available, halogen-free fire retardant thermoplastic sheathing material. The cables were tested while energised at 240 Volts (phase to earth) in the fire and mechanical shock test as described in the British Standard test BS6387 at 950° C. for 15 minutes with a severe mechanical shock every 30 seconds. It was found that the conductors insulated with the silicone elastomer and mica composition failed this test, while the conductors insulated with the silicone elastomer, mica and glass frit composition successfully withstood the conditions.

Example 7

The following compositions were prepared:
Composition 1—Silicone/mica/peroxide (78:20:2)
Composition 2—Silicone/mica/glass frit A/peroxide (70.5:20:7.5:2)

These were compression moulded with heating (150° C., 30 minutes) into panels (1200 mm×900 mm×10 mm) that were tested to assess relative fire resistance as measured by integrity failure according to the Australian Standard AS 1530 Part 4: Fire resistance tests of elements of building construction—Pilot furnace test. The panels were held up against the door frame of a gas-fired furnace that operates under positive pressure, and the samples were tested to the standard cellulose heating curve specified in the test which targets temperatures rising to 1150° C. over 240 minutes. Integrity failure is relevant for comparing materials that are intended to resist the passage of flame and was measured as the point where flame burst through first occurred; for composition 1 this was 24 minutes (when the average measured furnace temperature was 821° C.) and for composition 2 this was 97 minutes (when the average measured furnace temperature was 1023° C.). The results show that addition of the glass frit markedly improves performance as a fire barrier material.

Example 8

A sample of compound 2 from Example 7 was extruded into a door seal, crosslinked (170° C., 30 minutes) and fired at 1000° C. The sample demonstrated a high degree of structural integrity, maintaining the shape of the door seal after firing and displaying only minor shrinkage.

Example 9

Rectangular specimens made from chemically crosslinked silicone foams were fired at 1050° C. for 30 minutes (compositions shown in Table 8). The specimens dimensions were 18×5×3 mm, suitable for measurement of flexural mechanical properties using a dynamic mechanical analyser (DMA) in a 3-point bend test. Five samples of each composition were measured and the results were averaged to ensure good reliability. The silicone polymer is a two-part room temperature crosslinking material. A silane coupling agent, gamma-methacryloxypropyltrimethoxysilane, was also included in some compositions.

The effects of the silane coupling agent and the addition of a fire retardant on mechanical properties of the ceramified residue after firing at 1050° for 30 minutes are shown in Table 8.

TABLE 8

TABLE 8: Effect of flame retardant additive and the coupling agent on mechanical properties of foamed silicone compositions.

| Compositions | Flexural Modulus (MPa) | Flexural Strength (MPa) |
| --- | --- | --- |
| Silicone/mica/glass frit A/glass frit B (72:25:1.5:1.5) (I) | 7.40 | 1.45 |
| Silicone/mica/glass frit A/glass frit B/magnesium hydroxide (62:25:1.5:1.5:10) (II) | 6.56 | 1.72 |
| Silicone/mica/glass frit A/glass frit B/magnesium hydroxide/silane coupling agent (62:25:1.5:1.5:10:0.1) (III) | 7.28 | 1.47 |
| Silicone/mica/glass frit A/glass frit B/magnesium hydroxide/silane coupling agent (62:25:1.5:1.5:10:0.5) (IV) | 10.73 | 1.49 |

Adding the fire retardant, magnesium hydroxide, results in a small decrease in the flexural modulus and a small increase in flexural strength. Adding higher levels of the coupling agent increases the flexural modulus.

Example 10

Rectangular specimens made from chemically crosslinked silicone foam were fired at 1050° C. for 30 minutes (compositions given in Table 9). The specimens dimensions were 18×5×3 mm, suitable for measurement of flexural mechanical properties using a dynamic mechanical analyser (DMA) in a 3-point bend test. Five samples of each composition and were measured and the results averaged to ensure good reliability. The effect of zinc borate as a fire retardant and a glass-forming agent at low temperatures was investigated. The low-melting glass used (glass frit-B) softens at 525° C., while the softening temperature of zinc borate is between 300-700° C. Replacement of the low-melting glass with zinc borate was undertaken to improve the fire resistance of the ceramifiable system, while maintaining high stiffness and good shape retention.

The silicone-based composition from Example 9 was used. Table 9 shows flexural properties measured using a DMA in a 3-point bend test mode and mass loss measured by thermogravimetric analysis. These were determined in order to assess mechanical properties and fire-resistance of the modified sample. A lower level of mass loss indicates better fire resistance.

The results show that, with replacement of low-melting glass with zinc borate, not only better mechanical properties are achieved, but also much better fire-resistant properties (quantified through mass loss measurement) are obtained.

TABLE 9

Table 9: Effect of replacement of low melting glass with zinc borate on mechanical and fire resistant properties of silicone compositions.

| Compositions | Flexural Modulus (MPa) | Flexural Strength (MPa) | Mass loss(%) |
|---|---|---|---|
| Silicone/mica/glass frit A/glass frit B/magnesium hydroxide (62:25:1.5:1.5:10) (I) | 6.56 | 1.72 | 32 |
| Silicone/mica/glass frit A/zinc borate/magnesium hydroxide (62:25:1.5:1.5:10) (II) | 7.12 | 1.68 | 25 |

At 1050° C. the volume changes for composition I and composition II were −6% and −1%, respectively, indicating that replacement of low-melt glass with zinc borate produces less volume change.

Example 11

The silicone rubber-based composition, suitable for extrusion, including silicone rubber (DC 4-7219, Dow Corning), 20 parts of mica, 3 parts of glass frit A and 3 parts of glass frit B, was modified with different percentages of magnesium hydroxide and zinc borate to improve fire resistance and mechanical properties of the resulting ceramic formed by firing at 700° C. The specimens dimensions were 18×5×3 mm, suitable for measurement of flexural mechanical properties using a dynamic mechanical analyser (DMA) in a 3-point bend test. Five samples of each system were measured and the results averaged to ensure good reliability of results. The results are shown in Table 10.

Compound (II) in Table 10 showed better performance in terms of fire resistance and mechanical properties after firing at 700° C. Adding the magnesium hydroxide and zinc borate improves the fire resistance while improving flexural modulus and flexural strength.

TABLE 10

Table 10: Effect of the combination of flame retardant additives on flame retardant and mechanical properties of ceramified ash at lower temperature range.

| | 400° C. | | 700° C. | | |
|---|---|---|---|---|---|
| Compositions | Flexural Modulus (MPa) | Flexural Strength (MPa) | Flex Modulus (MPa) | Flexural Strength (MPa) | Observation of burning during exposure to open flame |
| Silicone rubber/mica/glass frit A/glass frit B (74:20:3:3) (I) | 3.2 | 0.32 | 9.6 | 0.63 | Ignited easily, flame sustainable, crumbled when burnt at a low temperature |
| Silicone rubber/mica/glass frit A/glass frit B/magnesium hydroxide/zinc borate (56.5:20:3:3:12.5:5) (II) | 1.38 | 0.18 | 14.17 | 1.36 | Hard to ignite flame, flame not sustainable, cohesive residue |

Example 12

Specimens of dimensions 30 mm×13 mm×2 mm were made from two materials X and Y by thermal crosslinking (170° C., 30 minutes, 7 MPa). The material X (Example 4a) is a composition in accordance with the invention with the specifications for the fire resistant material and material Y is of a composition known to fuse at temperatures above 800° C. They were placed on a rectangular piece of refractory so that their long axis is perpendicular to one edge of the supporting refractory block and a 13 mm long portion of each specimen is projecting out from the edge of the supporting refractory block. They were then heated at 12° C. per minute to 830° C. and 1000° C. and maintained at these temperatures for 30 minutes in air. At both temperatures, the specimens of composition X did not fuse and produced a coherent porous ceramic that retained the shape of the specimen prior to exposure to elevated temperatures. The shrinkage in all dimensions of the specimens of composition X was less than 2%. At both temperatures, the specimens of composition Y fused and the unsupported span bent over the edge of the refractory support to take a near vertical position showing the inability to retain shape or support its own weight. At 1000° C. the specimens of composition Y fused completely to form a glassy material that flowed on and along the sides of the refractory support.

The invention claimed is:

1. A fire resistant polymer composition based on a crosslinkable organopolysiloxane and containing inorganic filler for forming a self supporting ceramic under fire conditions, the composition comprising:
   the crosslinkable organopolysiloxane present in an amount of from 56.5% to 76.75% by weight of the total composition;
   mica in an amount of from 5% to 30% by weight based on the total weight of the composition; and
   a glass additive in a form selected from a group consisting of glass frits, glass fibre, and mixtures thereof in an amount of from 0.3% to 8% by weight based on the total weight of the composition,
   wherein after the composition is heated to 1000° C. and then held at 1000° C. for 30 minutes in air the composition exhibits less than about 10% volume shrinkage.

2. The composition according to claim 1, wherein the glass additive has a softening point below 1050° C.

3. The composition according to claim 1, wherein the glass additive has a softening point below 800° C.

4. The composition according to claim 1, wherein the glass additive has a softening point between 300 and 800° C.

5. The composition according to claim 1, wherein the glass additive comprises a blend of glass additives having low and high softening points.

6. The composition according to claim 1, wherein the glass additive has an alkali metal oxide content of less than 50% by weight of the glass additive.

7. The composition according to claim 1, wherein the glass additive has an alkali metal oxide content of less than 30% by weight of the glass additive.

8. The composition according to claim 7, further comprising inorganic fibers which do not melt at 1000° C.

9. The composition of claim 1, further comprising fire retardant materials which form oxides when exposed to ceramic formation temperatures selected from the group consisting of zinc borate, magnesium hydroxide and alumina trihydrate.

10. A composition according to claim 1, consisting essentially of the silicone polymer, mica, glass additive and a crosslinking agent.

11. The composition of claim 1, wherein the mica is a phlogopite mica.

12. The composition of claim 1, wherein the mica is a muscovite mica.

13. The composition of claim 1, wherein the mica has a mean particle size range of from 15 μm to 250 μm.

14. The composition of claim 13, wherein the mica has a mean average particle size range of from 50 μm to 200 μm.

15. The composition of claim 1, further comprising a silane coupling agent.

16. The composition of claim 15, wherein the silane coupling agent is selected from the group consisting of vinyltrimethoxysilane, aryl silane, epoxysilane, acrylsilane, polymeric silane and mercaptosilanes.

17. The composition of claim 15, wherein the silane coupling agent is present in an amount of from 0.05% to 2%.

18. The composition of claim 1, wherein the composition is extrudable.

19. The composition of claim 1, wherein a 1.7 mm thick sample of the composition has a penetration load greater than 40 N after having been heated to 600° C. at a rate of 10° C. per minute and then being held at 600° C. for 30 minutes in air.

20. The composition of claim 1, wherein a 3 mm thick sample of the composition has a flexural strength greater than 3.2 MPa after having been heated to 1000° C. and then being held at 1000° C. for 30 minutes in air.

21. The composition of claim 1, wherein the glass additive has a mean particle size less than 12 μm.

22. The composition of claim 1, wherein the composition has an electrical volume resistivity of greater than $6.7 \times 10^5$ ohm-cm.

23. The composition of claim 1, wherein the composition further comprises a fire retardant and a silane coupling agent, and a 3 mm thick sample of the composition has a flexural strength greater than 1.47 MPa and a flexural modulus greater than 7.28 MPa after firing at 1050° C. for 30 minutes.

24. The composition of claim 1, wherein the crosslinkable organopolysiloxane is composed of units of formula:

$$R_r SiO_{\frac{4-r}{2}}$$

wherein
R may be identical or different and are unsubstituted or substituted hydrocarbon radicals,
r is 0, 1, 2, or 3 and has an average numerical value of from 1.9 to 2.1.

25. A fire resistant polymer composition based on a crosslinkable organopolysiloxane and containing inorganic filler for forming a self support ceramic under fire conditions, comprising:
a polymer component consisting essentially of the crosslinkable organopolysiloxane wherein the crosslinkable organopolysiloxane is present in an amount of from 56.5% to 76.75% by weight of the total composition;
mica in an amount of from 5% to 30% by weight based on the total weight of the composition; and
a glass additive in a form selected from a group consisting of glass frits, glass fibre and mixtures thereof in an amount of from 0.3% to 8% by weight based on the total weight of the composition,
wherein after the composition is heated to 1000° C. and then held at 1000° C. for 30 minutes in air the composition exhibits less than about 10% volume shrinkage.

26. The composition according to claim 25, wherein the glass additive has a softening point below 1050° C.

27. The composition according to claim 25, wherein the glass additive has a softening point below 800° C.

28. The composition according to claim 25, wherein the glass additive has a softening point between 300 and 800° C.

29. The composition according to claim 25, wherein the glass additive comprises a blend of glass additives having low and high softening points.

30. The composition according to claim 25, wherein the glass additive has an alkali metal oxide content of less than 50% by weight of the glass additive.

31. The composition according to claim 25 wherein the glass additive has an alkali metal oxide content of less than 30% by weight of the glass additive.

32. The composition according to claim 25, further comprising at least one fire retardant material selected from the group consisting of zinc borate, magnesium hydroxide or alumina trihydrate.

33. The fire resistant composition of claim 1 or 25, wherein the amount of glass additive is sufficient to ensure the formation of a self supporting ceramic material at temperatures above the decomposition temperature of the silicone polymer and below the fire rating temperature of the composition.

34. The composition of claim 33, wherein the fusion temperature of the composition is above the fire rating temperature.

35. The composition of claim 33, wherein the composition undergoes a volume shrinkage of less than 10% when heated to the fire rating temperature.

36. The composition of claim 33 wherein the composition undergoes a volume shrinkage of less than 5% when heated to the fire rating temperature.

37. The fire resistant composition as claimed in claim 1 or 25 wherein said composition is applied in a passive fire protection use selected from the group consisting of a firewall lining, a fire partition, a screen, a ceiling or lining, structural fire protection, a fire door insert, a window or door seal, or a coating in an electrical switchboard cabinet.

38. The fire resistant composition as claimed in claim 1 or 25 wherein said composition forms a coating of an electrical conductor.

39. An electrical cable comprising a composition as claimed in claim 1 or 25.

40. The composition of claim 25, wherein the composition is extrudable.

41. The composition of claim 25, wherein the crosslinkable organopolysiloxane is composed of units of formula:

wherein
- R may be identical or different and are unsubstituted or substituted hydrocarbon radicals,
- r is 0, 1, 2, or 3 and has an average numerical value of from 1.9 to 2.1.

42. An electrical cable comprising a conductor and a polymeric composition extruded over the conductor, the polymeric composition comprising:
- a crosslinkable organopolysiloxane present in an amount of from 56.5% to 76.75% by weight of the total composition;
- mica in an amount of from 15% to 30% by weight based on the total weight of the composition; and
- a glass additive in an amount of from 0.3% to 8% by weight based on the total weight of the composition,
- wherein after the composition is heated to 1000° C. and then held at 1000° C. for 30 minutes in air the composition exhibits less than about 10% volume shrinkage.

43. The electrical cable of claim 42 wherein the mica has a mean particle size in the range of 50 μm to 200 μm.

44. An electrical cable of claim 42, wherein the mica is muscovite mica.

45. An electrical cable of claim 42 wherein the glass additive is present as glass frits.

46. A fire resistant polymer composition based on a crosslinkable organopolysiloxane and containing inorganic filler for forming a self supporting ceramic under fire conditions, the composition comprising:
- the crosslinkable organopolysiloxane present in an amount of from 56.5% to 76.75% by weight of the total composition;
- mica in an amount of from 5% to 30% by weight based on the total weight of the composition; and
- a glass additive in a form selected from a group consisting of glass frits, glass fibre, and mixtures thereof in an amount of from 0.3% to 8% by weight based on the total weight of the composition,
- wherein after the composition is heated to 1000° C. and then held at 1000° C. for 30 minutes in air the composition exhibits less than about 10% volume shrinkage,
- wherein a 1.7 mm thick sample of the composition has a penetration load greater than 40 N after having been heated to 600° C. at a rate of 10° C. per minute and then being held at 600° C. for 30 minutes in air, and
- wherein a 3 mm thick sample of the composition has a flexural strength greater than 3.2 MPa after having been heated to 1000° C. and then being held at 1000° C. for 30 minutes in air.

* * * * *

UNITED STATES PATENT AND TRADEMARK OFFICE
CERTIFICATE OF CORRECTION

| | | |
|---|---|---|
| PATENT NO. | : 7,652,090 B2 | Page 1 of 1 |
| APPLICATION NO. | : 10/523164 | |
| DATED | : January 26, 2010 | |
| INVENTOR(S) | : Alexander et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 776 days.

Signed and Sealed this

Twenty-third Day of November, 2010

David J. Kappos
*Director of the United States Patent and Trademark Office*